March 19, 1963    J. P. BAGBY ETAL    3,081,684
AUTOMATIC EXPOSURE CONTROL CAMERA
Filed Sept. 11, 1958    3 Sheets-Sheet 1

INVENTORS
John P. Bagby and
Stanley R. Freeland

March 19, 1963 J. P. BAGBY ETAL 3,081,684
AUTOMATIC EXPOSURE CONTROL CAMERA
Filed Sept. 11, 1958 3 Sheets-Sheet 2
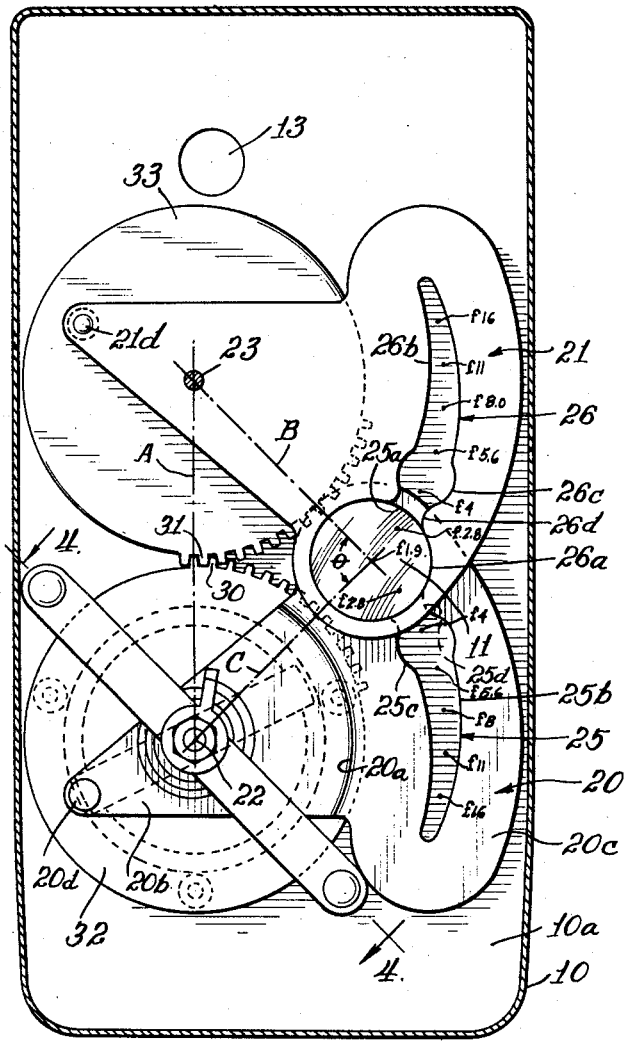
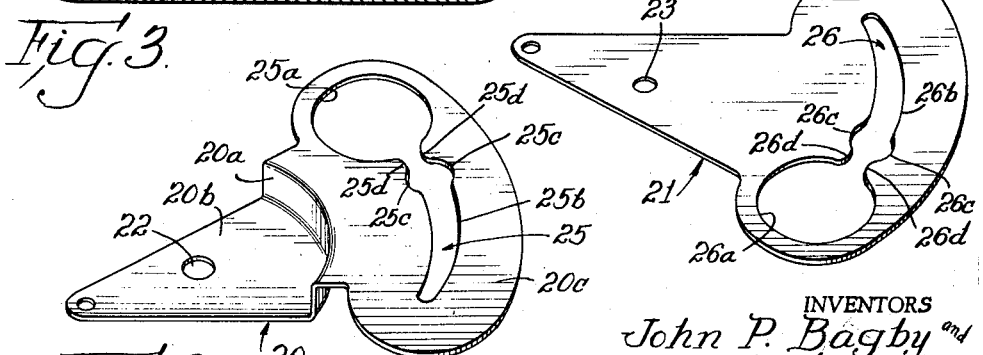
INVENTORS
John P. Bagby and
Stanley R. Freeland
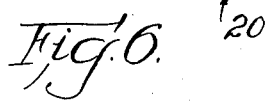
Atty.

March 19, 1963  J. P. BAGBY ETAL  3,081,684
AUTOMATIC EXPOSURE CONTROL CAMERA
Filed Sept. 11, 1958  3 Sheets-Sheet 3
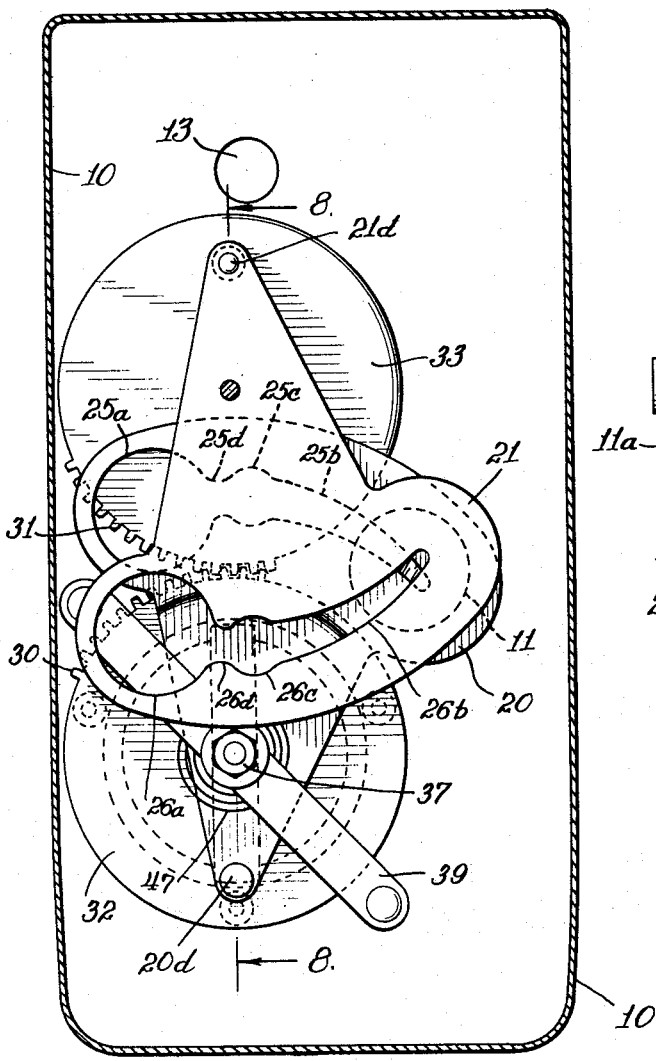
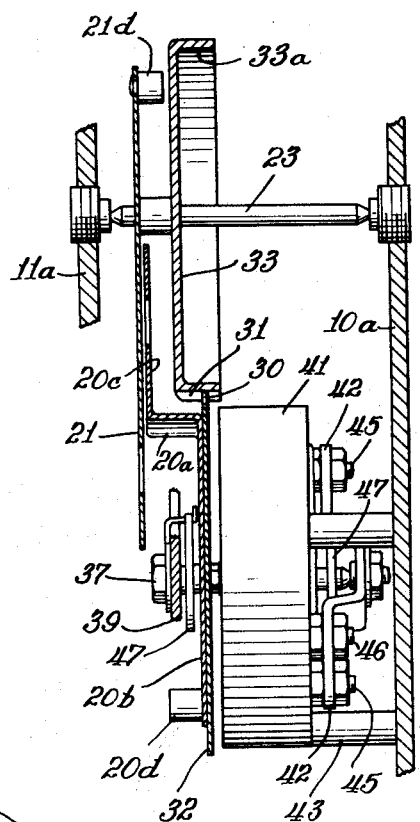
INVENTORS
John P. Bagby and
Stanley R. Freeland

3,081,684
AUTOMATIC EXPOSURE CONTROL CAMERA
John P. Bagby, Skokie, and Stanley R. Freeland, Evanston, Ill., assignors to Bell and Howell Company, Chicago, Ill., a corporation of Illinois
Filed Sept. 11, 1958, Ser. No. 760,459
1 Claim. (Cl. 95—64)

The present invention relates to photographic apparatus and, more particularly, is concerned with the provision of an improved and extremely compact apparatus for adjusting the exposure diaphragm of the camera automatically under varying light conditions. Additionally, the invention relates to an improved diaphragm opening configuration for said camera diaphragm.

As is known to those skilled in the camera art, the provision of automatic control of camera diaphragm in response to variations in the amount of light reaching the camera during exposure of the film therein, is broadly known in the art. One very satisfactory form of apparatus accomplishing this general function is illustrated in United States Letters Patent No. 2,841,064, issued July 1, 1958. The specific structure illustrated in that patent, is particularly effective for utilization in an eight millimeter movie camera employing a relatively small lens. However, it employs an arrangement of diaphragm members having some space disadvantage when employed in larger cameras, such as for example sixteen millimeter movie cameras.

As was clearly established in the above-mentioned Patent No. 2,841,064, it is not only feasible but practical to provide an automatic exposure control for photographic cameras in which a galvanometer directly drives a plurality of overlapping diaphragm blades and is in turn directly powered from the electrical output of a light responsive photoelectric cell. Satisfactory operation of such a system would, with the extremely small electrical outputs available from a photoelectric cell, require, however, that very little actual damping of the rotary components be provided and stability of the diaphragm, and hence the amount of light reaching the film, was achieved through the provision of inertia balance. In the system there specifically illustrated the rotary galvanometer coil was directly geared to a pair of overlapping iris or diaphragm blades which were geared for rotation in the same direction as each other but in opposition to the galvanometer. The rotary moments of inertia of the two diaphragm blades totaled approximately the rotary inertia of the oppositely rotating coil and as a result of this rotational inertia balance external accelerations applied to the camera did not affect the position of the diaphragm parts. At the same time, in view of the lack of friction, eddy current or other damping of the diaphragm blades, the diaphragm was extremely sensitive to torques applied by the galvanometer coil in response to light changes.

The improved camera apparatus of the present invention embodies the principles of rotational inertia balance for photographic cameras originally set forth in the above-mentioned patent. However, in accordance with the present invention only two rotating members are employed and these are arranged to provide a large area of diaphragm blade overlapping in a midpoint of the camera thereby effecting an improved and substantially more compact arrangement readily utilizable in the relatively large diameter lens sixteen millimeter camera constructions. Additionally, as a result of the arrangement of the present invention rotary inertia balance is provided thereby rendering the camera insensitive to external accelerations.

More specifically, in accordance with the present invention, an overlapping diaphragm blade structure is provided employing a first diaphragm blade directly mounted for rotation with the meter coil. A second diaphragm blade is directly geared to the first rotating meter coil-diaphragm blade combination and is appropriately weighted to provide inertia balance between the two rotating masses. As a result of this arrangement the overlapping portions of the diaphragm blades are positioned at a point generally intermediate the axes of rotation of the rotary members and by positioning the spaced axes of the rotary members along a generally vertical line relative to the camera housing, and providing a relatively large overlapping portion a relatively large aperture may be positioned generally centrally of the camera housing only slightly transversely spaced from the axes of rotation above mentioned, thereby providing an extremely compact inertia balanced camera of simple construction.

In furtherance of the compact camera structure of the present invention in which only two rotary diaphragm members are employed and wherein the coil is directly coupled with one of them, a novel meter and diaphragm blade configuration is provided. In accordance with the present invention the forward surface of both diaphragm blade members at their points of overlapping, are closely adjacent the forward surface of the front camera wall. In order to permit satisfactory mounting of the meter and at the same time achieve the directly coupled relationship above mentioned and the blade positioning, a stepped diaphragm blade is connected to the meter coil. This stepped construction permits positioning of the meter some distance behind the plane of the second diaphragm blade, and its mounting in cupped or jeweled bearings at opposite ends of the coil without the forwardly facing of such bearings projecting beyond the foremost of the diaphragm blades. Accordingly, extreme compactness is provided in the fore and aft directions as well as in the vertical dimension.

An additional aspect of the present invention is an improved overlapping diaphragm aperture-defining tear drop shape. In accordance with the principles of the present invention an irregular tear drop shape is employed for greater accuracy throughout the range of diaphragm openings. One preferred embodiment of this improved form comprises a tear drop having a generally circular large diameter portion connected to a substantially narrower wedge shaped portion with an irregularity at the point of junction. It has been found that a smooth curve tear drop configuration may be employed through the utilization of the irregularity above mentioned and that when thus employed, an extremely accurate diaphragm is provided.

It is, accordingly, an object of the present invention to provide an improved and substantially more compact inertia balanced camera particularly suitable for utilization with large diameter lenses.

Still a further object of the present invention is to provide an improved two blade diaphragm system for automatic exposure control cameras wherein one of the blades is directly carried with the diaphragm blade adjusting galvanometer coil.

Yet another object of the present invention is to provide an improved diaphragm blade aperture configuration.

Another object of the invention is to provide a simplified two element inertia balanced rotary diaphragm system for direct operation by a photoelectric cell-driven galvanometer coil.

A feature of the invention is an arrangement in which a pair of gears are directly coupled in opposite drive relation and carry statically balanced diaphragm blades for overlapping relation relative to a lens opening.

Another feature of the invention is a coil and diaphragm combination arrangement wherein a galvanometer coil is pivotally supported in cup or socket bearings adjacent the ends thereof and carries attached thereto at an intermediate position a diaphragm blade which extends radially and then axially in a step fashion to position the outermost portion thereof in a plane axially outside of both of said coil bearings.

Still other and further objects and features of the present invention will at once become apparent to those skilled in the art from a consideration of the herewith attached drawings wherein a preferred form of the invention is shown by way of illustration only, and wherein:

FIGURE 3 is a cross-sectional view taken along the lines 3—3 of FIGURE 1 and illustrating, in end-elevation, the meter and diaphragm blade elements of the automatic exposure control;

FIGURE 4 is a cross-sectional view taken along the lines 4—4 of FIGURE 3 and illustrating the construction of the meter coil and diaphragm blade carried thereby;

FIGURE 5 is an isometric view of one of the diaphragm blades of the camera of the present invention;

FIGURE 6 is an isometric view of the second diaphragm blade of the present invention;

FIGURE 7 is a cross-sectional view taken along the lines 3—3 of FIGURE 1 and showing the parts in a second position adjacent the other extreme of movement from the position shown in FIGURE 3; and FIGURE 8 is a cross-sectional view taken along the lines 8—8 of FIGURE 7 illustrating in detail the geared relationship between the diaphragm members.

As shown on the drawings:

Figure 1:
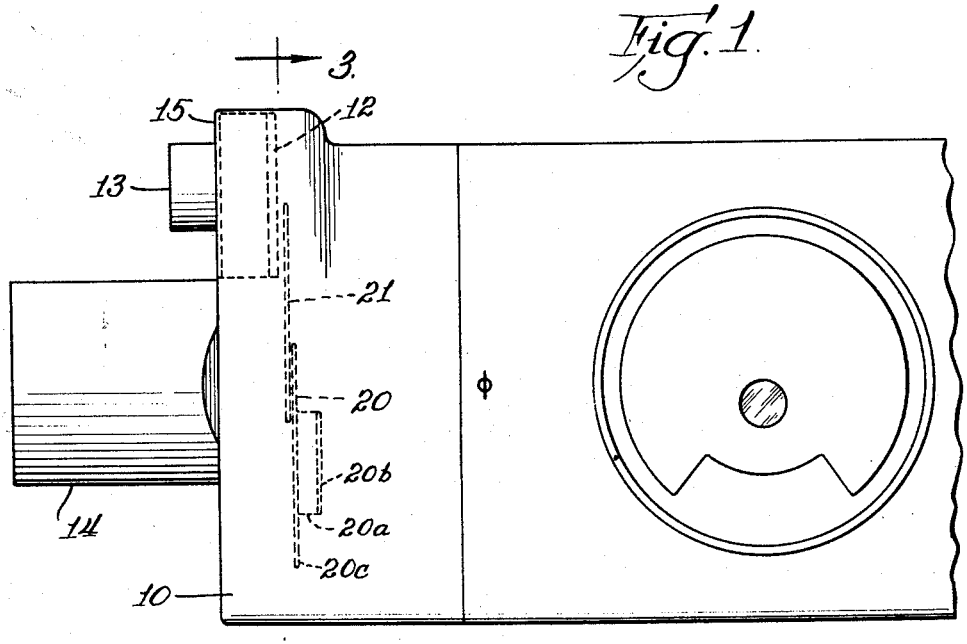
FIGURE 1 is a side-elevational view of a camera constructed in accordance with the principles of the present invention and illustrating certain components thereof in dotted lines.
Figure 2:
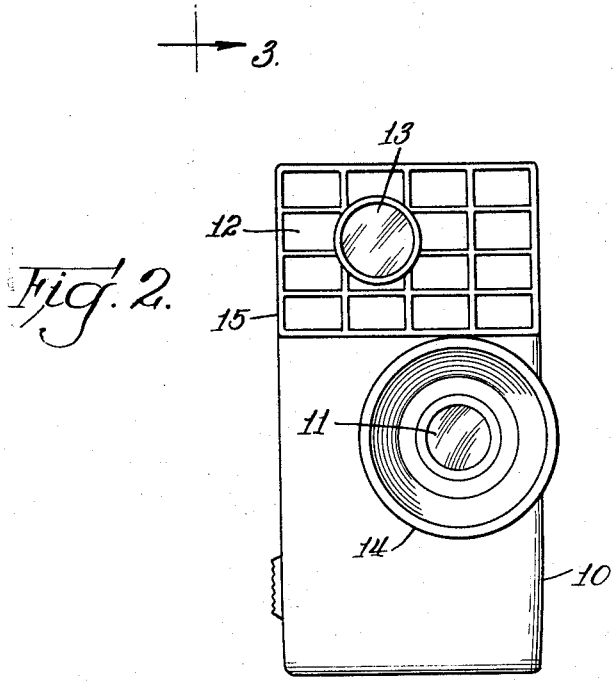
FIGURE 2 is an end-elevational view of the camera illustrated in FIGURE 1.

As may be seen from a consideration of FIGURES 1 and 2, the exposure control of the present invention is preferably employed in a compact moving picture camera employing a relatively large lens, such as, for example, a lens adapted for use with sixteen millimeter film the entire width of which is to be exposed. It is preferred that the camera assume a smooth, streamline, outward configuration, that a photoelectric cell be provided for controlling an automatic exposure apparatus and that automatic exposure apparatus be positioned within the confines of the camera case. This is efficiently accomplished in the camera arrangement illustrated, where the camera housing is indicated at 10, a lens is indicated at 11, a forwardly facing photoelectric cell is provided at 12, and a viewfinder window is provided at 13, all within a minimum housing or envelope. In the over-all arrangement shown in FIGURES 1 and 2, the lens 11 is shrouded by a light shield 14. The shield 14 prevents undesired stray light from striking the lens, in the usual manner and a somewhat similar compartmentized shield 15 is provided in front of the photoelectric cell 12 to assure that the light reaching the surface of the photoelectric cell accurately reflects the light reflected from the scene to be photographed.

In spite of the compact arrangement of forwardly facing camera parts shown in FIGURES 1 and 2, a completely automatic exposure control is provided in the present camera. This is accomplished through utilization of a novel two-blade diaphragm which may clearly be understood from a consideration of FIGURES 3–8. As seen in FIGURE 3 a pair of overlapping diaphragm blades 20 and 21 are mounted for rotational movement about respective axes 22 and 23. The blade 20 is directly carried by the rotatable coil and armature assembly 23 of a galvanometer and, as will be more fully discussed below, is provided with an axial step 20a separating two generally parallel sections 20b and 20c. The planar portion 20c is positioned immediately adjacent to diaphragm blade 21 in overlapping relation thereto and co-operates therewith to provide an exposure aperture.

The exposure aperture is formed, more specifically, by a pair of generally tear drop shaped openings 25 and 26 in the respective blades 20 and 21. In the position of maximum aperture, in which the greatest amount of light is passed by the diaphragm blades, the blades are positioned as shown in FIGURE 3. As the blade 20 rotates in the counterclockwise direction, and the blade 21 rotates in the clockwise direction, the blades move to a position of minimal light transmission, such as shown in FIGURE 7 where the lens 11 is substantially covered by the blades.

In the arrangement shown, the blades 20 and 21 are directly geared together for rotation in opposite directions in simultaneous and positively timed relation. This gearing interconnection is formed by gear segments 30 and 31 formed on rotating elements 32 and 33 respectively. The gear member 32 is, with the blade 20, carried for rotation with the galvanometer armature 23 as clearly illustrated in FIGURE 4. As there shown, the galvanometer armature coil 23 is oscillatably carried relative to a core magnet 35, in bearings 36 and 37 which are fixedly secured to a cage structure generally indicated at 38. This structure comprises a top strap 39 directly carrying the socket bearing 37, an intermediate strap 40, a cylindrical ring 41, a bottom strap 42 and support posts 43. As may be seen from FIGURES 4 and 8, the ring 41 is rigidly secured to the mounting plate 10a of the camera casing 10 by means of the support posts 43 and the ring in turn rigidly carries the strap 39, 40 and 42 by means of the securing bolts 45. The armature core 35 is rigidly secured to the intermediate strap 40 and the bottom strap 42 by means of securing bolts 46. It will be at once apparent from a consideration of the arc of swing of the blades 20 and 21, that the blade 21 would, if in the same general plane as the meter coil 23, strike the meter coil 23 and associated parts when approaching the extreme position shown in FIGURE 7. In accordance with the present invention the parts are arranged to avoid this problem by positioning the blade 21 in a plane above the plane of the top strap 39. This positioning permits complete freedom of the blade 21 from the apparatus of the galvanometer. At the same time, this forward or upward positioning of the blade 21 requires that the blade 20 be stepped, as above noted at 20a, to position the aperture carrying portion 20c of the blade immediately adjacent the plane of blade 21. As a result of this arrangement the bearings 36 and 37 may be axially spaced a substantial distance apart, thereby improving the stability of the armature coil 23 and at the same time a minimum axial space for the blades is necessary. Further, as a practical matter, the axially spaced relationship between the aperture carrying portions of blades 20 and 21 is employed to advantage in construction of the gears 32 and 33. As may be seen from FIGURE 8, the gear 33 is generally cup-shaped and is substantially heavier than gear 32. At the same time gear 32 is an extremely thin sheet of light weight material to minimize its weight.

As was noted before, it is desired that the diaphragm blades and the members rotating with each of them be statically and inertially balanced. Such balances, as explained in the above-mentioned Bagby et al. Patent No. 2,841,064 prevent undesired oscillation of the blades 20 and 21 under the influence of external accelerations applied to the camera. Further, it will be clear that such balance is achieved in a two-blade camera such as herein shown when the rotational inertia of the gear 33, blade 21, and the blade-carrying axle pivot 23 equals the rotational inertia of the light weight gear 32, the blade 20, the axle pivot 22, and the armature coil 23 taken along with the armature positioning springs 47 which operate to bias the coil 23, and hence the blade 20, in the clockwise direction as viewed in FIGURE 3 toward a position of maximum aperture opening. Since the blade 20 is rigidly carried by the galvanometer it will be clear that the blade 21 would be insufficient to rotationally balance the combined inertia of the blade 20 and its associated rotating parts. Accordingly, the gear 33 is substantially greater in weight than the gear 30 to compensate for the weight of the galvanometer parts. At the same time, this additional weight necessity is employed to advantage in providing the axial extension, or cylindrical wall 33a. This extension permits relatively long geared teeth 31 for cooperation with the thin gear 30, thereby assuring satisfactory contact between the gear segment 30 and 31 while permitting extremely thin gear 32. The over-all result is, as may be seen from FIGURE 8, an extremely compact and yet efficient combined gear and blading construction.

In the arrangement illustrated, the relatively large aperture-defining portions of the blades 21 and 22 are balanced by respective counterweights 20d and 21d. The counterweight 20d projects upwardly to avoid conflict with any of the remaining parts and the counterweight 21d projects downwardly for similar reasons. If it is designed that the gear 33 extend upwardly a somewhat greater extent, the counterweight 21d may, of course, be placed on the gear 33 and in such event would, of course be preferably positioned on the lower, or right hand side of the gear 33 as viewed in FIGURE 8.

As may be seen from a consideration of FIGURES 3 and 7, the arrangement providing a pair of overlapping blades one of which is directly carried by the meter, permits central placement of the camera lens 11. Further, the lens 11 may, as shown, be placed very close to the meter itself while still providing a substantially rectangular opening. The rectangular shape is provided by placing the axis of lens 11 as shown, with the triangle formed by center lines A, B and C such that angle θ approximates 90°. With this relationship the generally arcuate tear drop apertures cross each other generally at right angles.

In considering the specific configuration of the apertures in the individual diaphragm members 20 and 21, it will be noted that the apertures 25 and 26 comprise an irregular tear drop shape. Thus, each aperture comprises a large generally round end portion, 25a, 26a, an extending wedge shaped narrow portion 25b, 26b and an intermediate bulge or enlargement 25c, 26c. This configuration is important and has proved to provide an extremely accurate transition from wide-open diaphragm aperture to diaphragm aperture of maximum constriction. As is well known in the photographic art the amount of lens opening is ordinarily designated by the f stop. Successive conventional fixed f stops for cameras such as a movie camera of the type here involved would comprise f1.9, wide open; f2.8; f4; f5.6; f8; f11; and f16, maximum restriction. Each of these f stops designates an actual change in the passage of light amounting to one-half of the light passed by the next larger aperture. For example, one half of the light passed through a diaphragm aperture f1.9 will pass through an aperture f2.8 and one-half of the light passed by an f2.8 aperture will pass through an aperture f4.0. This means, in a practical way, that the large aperture portion 25a, 26a must reduce into a light passing aperture one-half as great for the next succeeding f stop 2.8. For convenience, the center of the apertures formed by the overlapping blades are indicated in the drawings, FIGURE 3, it being apparent that the blades provide infinite adjustment in which the indicated stops are merely noted for conventional reference.

The overlapping of the two blades at the junction between the large portions 25a, 26a and the wedge-shaped portions 25b, 26b provides an extremely irregularly shaped diaphragm opening. It has been found through exhaustive tests that unless an extremely abrupt change, approximating a right angle corner, is provided between the wedge-shaped portions 25b, 26b and their respective enlarged portions, an excessive amount of light is passed through the aperture between the f2.8 and f4.0 positions. It is desirable, however, in order to eliminate sharp corners and prevent any possibility of an upstanding burr on such a corner from causing the extremely light weight parts to bind or stick, and to prevent any possible reflection from such a sharp corner, that the portion intermediate between the wedge-shaped portion 25b, 26b and the enlarged portions 25a, 26a comprise a smooth curve. This may be accomplished in accordance with the present invention by extending the curve portion 25d, 26d inwardly of the wedge-shaped portions 25b, 26b in a manner constricting the wedge portion immediately adjacent the large portion of the aperture and then immediately relieving this constriction back beyond the width of the wedge-shaped portions 25b, 26b as is clearly indicated in the drawings. It has been found through the above mentioned tests that this irregular necked-in configuration provides a truly linear relationship for successive f stops where a tear drop employing a wedge-shaped portion smoothly filleted into the large portion will not provide satisfactory results. This result is achieved in spite of the fact that from first glance such an irregular configuration would seem deleterious rather than beneficial.

It will be apparent from a consideration of the above specification and the attached drawings that we have provided a substantially improved and greatly simplified automatic exposure control camera incorporating a completely inertia balanced diaphragm and providing an accurate control of the amount of light passed through the lens throughout the range of diaphragm adjustment. Those skilled in the art will at once appreciate that variations and modifications may be made in the structure shown by way of illustration in the present specification without departing from the scope of the novel concepts thereof and it is, accordingly, our intention that the scope of the present invention be limited solely by that of the hereinafter appended claims.

We claim as our invention:

In a photographic camera, the combination comprising means forming an exposure aperture, a photoelectric cell responsive galvanometer coil having an axis of rotation parallel to the axis of said aperture and responsive to light conditions in front of said aperture to rotate, a first diaphragm blade mounted on said coil for rotation therewith in overlapping relation relative to said aperture, a second diaphragm blade mounted for rotation about an axis parallel to the axis of rotation of said coil and having a portion thereof overlapping said aperture, said first diaphragm blade and said coil, gear means directly connected to said coil and gear means rigidly secured to said second diaphragm blade and in direct drive relation with said first gear means whereby said diaphragm blades rotate in opposition to each other at identical angular velocities, said coil and said first diaphragm blade being positioned intermediate first and second bearings therefor, said first diaphragm blade having a portion thereof connected to said coil lying in a plane perpendicular to the said axis of rotation of said coil and between said bearings and adjacent said first bearing, said first diaphragm blade having an axially extending step and a diaphragm defining aperture portion carried by said step in a plane positioned axially on the opposite side of said first bearing from the plane of said portion carried by said coil and support means for said lastnamed bearing positioned axially on the same side of said second blade as said coil.

References Cited in the file of this patent

UNITED STATES PATENTS

| | | |
|---|---|---|
| 2,261,532 | Tonnies | Nov. 4, 1941 |
| 2,297,262 | Tonnies | Sept. 29, 1942 |
| 2,465,578 | Czarnikow et al. | Mar. 29, 1949 |
| 2,556,546 | Lee | June 12, 1951 |
| 2,841,064 | Bagby et al. | July 1, 1958 |

FOREIGN PATENTS

| | | |
|---|---|---|
| 698,573 | Great Britain | Oct. 21, 1953 |
| 941,875 | Germany | Apr. 19, 1956 |